W. L. WOODS.
Parallel Ruler.
No. 50,980. Patented Nov. 14, 1865.
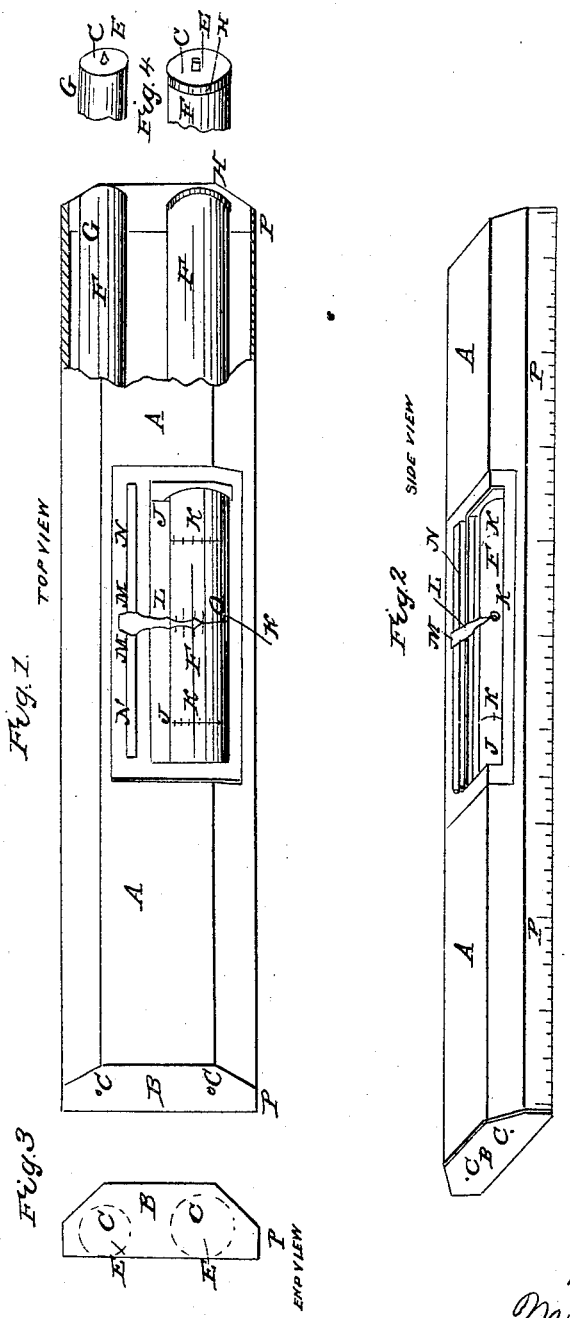

UNITED STATES PATENT OFFICE.

W. L. WOODS, OF WASHINGTON, DISTRICT OF COLUMBIA.

IMPROVEMENT IN PARALLEL RULERS.

Specification forming part of Letters Patent No. 50,980, dated November 14, 1865.

*To all whom it may concern:*

Be it known that I, W. L. WOODS, of Washington city, District of Columbia, have invented a new and useful Improvement in Parallel Rulers of such peculiar construction that when used in drafting plain distances the dividers or compass is not required for measurements, of which the following is a specification.

To enable others skilled in the art to make and use my invention, I will proceed to describe its construction and operation, reference being had to the accompanying drawings, making a part of this specification, in which—

Figure 1 represents a top view; Fig. 2, a side view; Fig. 3, an end view, and Fig. 4 an end view of the cylinders or rollers.

I construct a box or frame, A, parallelogram in shape, in which I confine to its ends B, by pivots C in their axis E, so they will freely revolve, two cylinders, F, of equal or unequal diameters and lengths, parallel to each other and to the sides of the frame or box. These cylinders on their surfaces, in whole or part, are slightly roughed or minutely dentated, G; or they may be supplied with spurred sections H, two or more, so that they will take hold of the surface over which their revolutions are thus insured, and not be liable to slip or vary from a direct line.

On the top of the box or frame A, near the edge of a sufficient opening, J, which fairly discloses the scales K on the cylinder or roller F, is fixed an index-finger, L, (or it may be attached by a movable slide, M, to an arm, N, so as to be used with any of the scales,) with its point O resting on the scale so as to accurately mark its subdivisions. This scale and index-finger may be made ratchet fashion, and there may be one or more of each attached to the cylinders, as the case may require.

The cylinders F and the sides P of the ruler may be marked with any of the known scales suited to such instrument. In another and more simple form I construct my ruler as above described, leaving out one of the cylinders.

To use my invention I place it in proper position resting on its cylinders, and with a gentle pressure of the left hand propel it in the direction required over the surface on which I wish to draw lines. The scale K on the cylinder and the index-finger L will indicate the distance between, and the scale on the sides P of the rule the length of the lines to be drawn.

I claim as my invention—

The box or frame A, the cylinders or rollers F, and the index-finger L, with their constituent parts, in combination, substantially and for the uses and purposes as above described.

W. L. WOODS.

Witnesses:
C. S. MATTOON,
JAMES STEELE.